United States Patent
Wunderlich et al.

(10) Patent No.: US 11,777,326 B2
(45) Date of Patent: Oct. 3, 2023

(54) DEVICE FOR PREVENTING OVERVOLTAGE-INDUCED DAMAGE CAUSED BY FAULT PROPAGATION IN SAFETY-RELEVANT SYSTEMS

(71) Applicant: Vitesco Technologies GmbH, Regensburg (DE)

(72) Inventors: Andreas Wunderlich, Munich (DE); Alfons Fisch, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/769,818

(22) PCT Filed: Oct. 7, 2020

(86) PCT No.: PCT/EP2020/078124
§ 371 (c)(1),
(2) Date: Apr. 18, 2022

(87) PCT Pub. No.: WO2021/073980
PCT Pub. Date: Apr. 22, 2021

(65) Prior Publication Data
US 2022/0416556 A1 Dec. 29, 2022

(30) Foreign Application Priority Data
Oct. 17, 2019 (DE) .................... 10 2019 215 989.3

(51) Int. Cl.
*H02J 7/00* (2006.01)
*B60R 16/033* (2006.01)

(52) U.S. Cl.
CPC ........ *H02J 7/00308* (2020.01); *B60R 16/033* (2013.01); *H02J 7/00032* (2020.01); *H02J 7/0047* (2013.01); *H02J 7/0063* (2013.01)

(58) Field of Classification Search
CPC .. H02J 7/00308; H02J 7/00032; H02J 7/0047; H02J 7/0063; B60R 16/033
See application file for complete search history.

(56) References Cited

U.S. PATENT DOCUMENTS 6,498,403 B1 * 12/2002 Hagidaira ............ B62D 5/0484
307/9.1
9,366,335 B2   6/2016 Habenschaden
(Continued)

FOREIGN PATENT DOCUMENTS

CN    109709963 A    5/2019
DE    102011082033 A1    3/2013
(Continued)

*Primary Examiner* — Carlos Amaya
(74) *Attorney, Agent, or Firm* — Laurence A. Greenberg; Werner H. Stemer; Ralph E. Locher

(57) ABSTRACT

A device controls a safety-relevant electronic system and has a power supply. The power supply is supplied with a battery voltage at a first input terminal and supplies a first supply voltage at a first output terminal which is lower than the battery voltage. A microcontroller for generating a first control signal, provided at a first control output of the microcontroller for processing by way of a control unit, is supplied with the first supply voltage at a second input terminal. A monitoring unit for generating a second control signal, provided at a second control output of the monitoring unit for processing by the control unit, is supplied with the first supply voltage at a third supply potential input terminal. The third supply potential input terminal, the second control output and the second data port of the monitoring unit are configured to be voltage-proof with respect to the battery voltage.

15 Claims, 2 Drawing Sheets

(56) References Cited

U.S. PATENT DOCUMENTS 9,627,880 B2 4/2017 Garbossa
2020/0207374 A1 7/2020 Li

FOREIGN PATENT DOCUMENTS

DE 102014115800 A1 5/2015
DE 102014213206 A1 1/2016
EP 3674845 A1 7/2020

* cited by examiner

DEVICE FOR PREVENTING OVERVOLTAGE-INDUCED DAMAGE CAUSED BY FAULT PROPAGATION IN SAFETY-RELEVANT SYSTEMS

FIELD AND BACKGROUND OF THE INVENTION

The invention relates to a device for controlling a safety-relevant electronic system. In particular, the invention relates to a device for controlling a safety-relevant electronic system in a vehicle.

Safety-relevant electronic systems have redundantly designed components for controlling a load and/or for protecting a communication. For this purpose, the device is designed in such a way that the components are physically independent of clock and supply voltage and have decoupled signal links and the like in order to prevent interactions when a fault occurs.

A safety-relevant electronic system is characterized by the fact that it can detect faults independently of one another via the redundantly designed components and initiate a fault reaction independently of one another, for example via dedicated paths for switching off the safety-relevant load. Another feature of a safety-relevant electronic system is that faults that affect the redundantly designed components at the same time (so-called common cause faults) are avoided by means of suitable design measures for the device.

A problem that has not yet been satisfactorily solved is that a critical voltage, due to fault propagation, can lead to damage to components of the device to which the critical voltage is not directly applied. Control of the safety-relevant electronic system is therefore no longer reliably guaranteed.

SUMMARY OF THE INVENTION

It is the object of the invention to specify a device for controlling a safety-relevant electronic system which is structurally and/or functionally improved and reliably prevents fault propagation, in particular due to a critical overvoltage.

This object is achieved by means of a device in accordance with the features of the independent claim.

A device for controlling a safety-relevant electronic system is proposed. The safety-relevant electronic system may be any technical system in which special protection of a component that is to be controlled is required, such as in an industrial environment, for example. The safety-relevant electronic system is in particular a technical system of a vehicle, for example for providing a partially, highly or fully autonomous driving function.

The device comprises a power supply unit having at least one voltage regulator. The power supply unit is supplied with a battery voltage during operation at a first supply potential input terminal. The power supply unit supplies a first supply voltage at a first supply potential output terminal which is lower than the battery voltage.

The device further comprises a microcontroller for generating a first control signal. The control signal is provided at a first control output of the microcontroller for processing by way of a safety-relevant control unit. The microcontroller is supplied with the first supply voltage at a second supply potential input terminal. The microcontroller further comprises a first data port.

As a further component, the device comprises a monitoring unit for generating a second control signal, which is provided at a second control output of the monitoring unit for processing by way of the safety-relevant control unit. The monitoring unit is supplied with the first supply voltage at a third supply potential input terminal. The monitoring unit further comprises a second data port.

The monitoring unit constitutes a component that is independent of the microcontroller and that monitors the function of the microcontroller. If both components are operating as intended, the first and the second control signal must match in a predetermined manner. If the first and the second control signal do not match in a predetermined manner, this is detected by the safety-relevant control unit, which then switches off the safety-relevant electronic system, for example. A match in a predetermined manner, which indicates that the components are operating as intended, is present, for example, when the first and second control signals are identical. The safety-relevant electronic system is switched off by the safety-relevant control unit when the first and second control signal have different values. As an alternative, there is also a match in a predetermined manner, for example, if, in order to achieve diversity, the first and second control signal are inverse to one another. The safety-relevant electronic system is switched off by the safety-relevant control unit when the first and second control signal have identical values.

The device further comprises a communication link between the first data port of the microcontroller and the second data port of the monitoring unit.

According to the invention, the second supply potential terminal, the second control output and the second data port of the monitoring unit are designed to be voltage-proof with respect to the battery voltage.

In the present description, a voltage-proof design is to be understood as meaning that the inputs and outputs mentioned, for example due to suitable manufacturing processes, have a dielectric strength which is above the maximum voltage occurring in the device. The highest voltage occurring in the device is the battery voltage. The voltage-proof inputs and outputs of the monitoring unit are then, for example, 20%, 30% or 50% above the rated battery voltage. If the battery voltage is, for example, 12V, the inputs and outputs of the monitoring unit have a dielectric strength of, for example, 18V (that is to say 50% above the rated battery voltage of 12V). The voltage-proof design of the inputs and outputs of the monitoring unit can be brought about, for example, by adapting the manufacturing process of the monitoring unit accordingly, for example by using other semiconductor materials, larger dimensions, larger insulation layers, etc. In principle, any suitable measure that contributes to the intended dielectric strength can be selected. Since these measures are known in principle from the prior art, no further detailed description is given in relation to these.

According to an expedient embodiment, the monitoring unit comprises a controllable switching unit for generating the control signal. The controllable switching unit is supplied with a second supply voltage at a fourth supply potential input terminal which is lower than a first predetermined voltage value which corresponds to the maximum permissible voltage of the microcontroller at which no damage occurs. This embodiment makes it possible to avoid an internal fault in the monitoring unit due to a faulty voltage at the fourth supply potential input terminal. The second supply voltage is selected here in such a way that the function of the controllable switching unit is guaranteed, but the level of the voltage is not critical with regard to internal faults in the monitoring unit.

In particular, the second supply voltage may be greater than a second predetermined voltage value which is greater than the first supply voltage. In other words, the second supply voltage at the fourth supply potential input terminal is lower than the maximum permissible voltage of the microcontroller at which no damage occurs, and in particular is greater than the first supply voltage.

Another expedient embodiment makes provision for the power supply unit to comprise as voltage regulator a first voltage regulator for generating the second supply voltage and a second voltage regulator for generating the first supply voltage. The first and the second voltage regulator can be connected as a cascade, with the second voltage regulator being supplied with the second supply voltage generated by the first voltage regulator as input voltage. The first voltage regulator may be formed, for example, by a pre-regulation system; the second voltage regulator may be formed as a linear or SMPS regulator.

Another expedient embodiment makes provision for all inputs and outputs of the monitoring unit to be designed to be voltage-proof with regard to the battery voltage. In particular, in addition to the second supply potential input terminal, the third control output and the second data port, the fourth supply potential input terminal is also designed to be voltage-proof.

Another expedient embodiment makes provision for the monitoring unit to comprise a monitoring module which is designed to receive and to process data from the microcontroller via the second data port and, when a function of the microcontroller as intended is determined, to cause the controllable switching unit to generate the second control signal. This technical design measure allows faults to be initiated independently of one another via the dedicated switch-off paths and output of the first and second control signal.

The invention has a series of advantages. Due to the fact that the monitoring unit and the microcontroller can be supplied from a common power supply unit, a separate voltage regulator for the monitoring module can be saved. Safety is maintained in that all inputs and outputs of the monitoring unit are designed to be voltage-proof. The saving of a separate voltage regulator for the monitoring unit furthermore also enables redundant protective circuits, for example against overvoltages, polarity reversal and the like, to be saved.

Another advantage is that the switch-off paths are not directly dependent on the battery voltage since the monitoring unit is supplied with a first supply voltage that is different from the battery voltage. The controllable switching unit that generates the second control signal is moreover preferably supplied with a second supply voltage, as a result of which a fault in the device caused by the battery voltage cannot be impressed on the monitoring unit. The safety concept enables so-called single faults to be excluded as a result.

The invention is explained in greater detail below on the basis of an exemplary embodiment in the drawing.

DETAILED DESCRIPTION OF THE INVENTION

Figure 1:
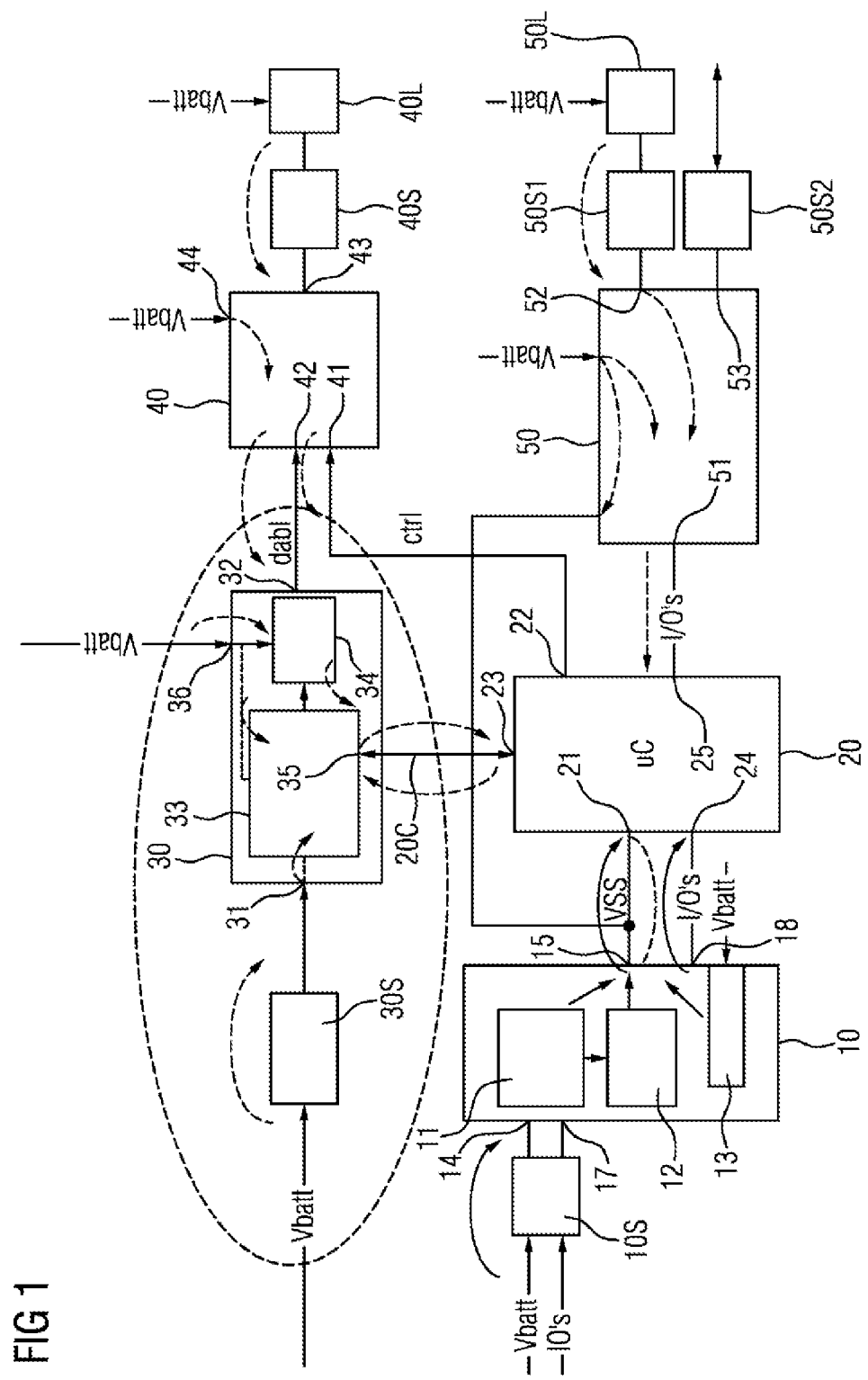
FIG. 1 shows a schematic illustration of a conventional device for controlling a safety-relevant electronic system.

FIG. 1 shows a schematic illustration of a known device for controlling a safety-relevant electronic system, on the basis of which the problem on which the present invention is based is explained. The safety-relevant electronic system may, for example, be a system of a vehicle, for example for a partially, highly or fully autonomous driving function for a transverse and/or longitudinal movement of the vehicle. The technical system may also be in other technical domains.

The device comprises a power supply unit 10, a microcontroller 20, a monitoring unit 30, a safety control unit 40 and a logic control unit 50 as essential components.

In this example, the power supply unit 10 comprises a first voltage regulator 11 and a second voltage regulator 12. The first voltage regulator 11 represents a pre-regulation system. The second voltage regulator 12 is, for example, a linear regulator or an SMPS (switched-mode power supply) regulator. Alternatively, the power supply unit 10 could also comprise only one voltage regulator. Moreover, the power supply unit 10 may comprise one or more further functional components 13. The components mentioned are integrated on a chip.

The power supply unit 10 is supplied with a battery voltage Vbatt via a first supply potential input terminal 14. In this case, the battery voltage Vbatt is not fed to the first supply potential input terminal 14 directly, but rather via a protective circuit 10S. The protective circuit 10S may include, for example, one or more diodes, capacitors, an ESD (electrostatic discharge) component and the like. The component or components of the protective circuit 10S are provided outside the power supply unit 10, since the components thereof cannot be provided in an integrated form or can only be provided at economically disproportionately high costs.

External input and output data (control data, communication data) can be fed to the power supply unit 10 at an input/output port 17. The input and output data are preferably also routed via the protective circuit 10S to the input/output port 17 and, for example, processed by the functional component or components 13. The input and output data can also be routed via their own protective circuit. A further input/output port 18 is provided for internal data communication of the power supply unit 10.

As is shown in the exemplary embodiment in FIG. 1, the functional component 13 can be supplied with the battery voltage at a terminal, which is not shown in greater detail.

By means of the first and second voltage regulator 11, 12, the battery voltage Vbatt supplied to the power supply unit 10 is reduced to a first supply voltage Vss, with the first supply voltage Vss being lower than the battery voltage Vbatt (Vss<Vbatt). The supply voltage Vss is provided at a first supply potential output terminal 15 of the power supply unit 10.

The microcontroller 20 is used to generate a first control signal ctrl, which is provided at a first control output 22 for processing by way of the safety-relevant control unit 40. The first control signal ctrl is used, for example, to switch off a safety-relevant load 40L which is controlled by the safety control unit 40.

In order to operate the microcontroller 20, it receives, at a second supply potential input terminal 21, the first supply voltage Vss provided by the power supply unit 10 at the first supply potential input terminal.

The microcontroller 20 also has an input/output port 24, which is connected to the input/output port 18 of the power supply unit 10 for the purpose of exchanging data. The data may, for example, be received and/or processed and/or transmitted by the functional component or components 13. In addition, an input/output port 23 is provided for the purpose of exchanging data with the monitoring unit 30.

The microcontroller 20 is also connected to an input/output port 51 of the logic control unit 50 via an input/output port 25. The logic control unit 50 is designed to control a non-safety-relevant load 50L. For this purpose, the logic control unit 50 is connected to the load 50L at a control signal output 52 via a protective circuit 50S1. The logic control unit 50 can be connected via a control signal output 53 or an input/output port to further components for the purpose of exchanging data.

The logic control unit 50 and the components connected to it constitute component parts of a control function that is not described in more detail, for example for an actuator or a communication interface. Since the exact function, both of the safety-relevant system and of the components connected to the logic control unit 50, is not important for understanding the present invention, this is not explained in further detail.

The monitoring unit 30 comprises a monitoring module 33 and a controllable switching unit 34. The monitoring unit 30 comprises a third supply potential input terminal 31, a second control output 32, a second data port 35 and a fourth supply potential input terminal 36.

The monitoring unit 30 is supplied with the battery voltage Vbatt via a protective circuit 30S via the third supply potential input terminal 31. The protective circuit 30S, analogously to the protective circuit 10S, comprises diodes, capacitors and ESD components and is intended, in particular, to provide protection against overvoltages.

A second control signal dabl generated by the monitoring unit 30, more precisely the controllable switching unit 34, is provided at the second control output 32 for processing by way of the safety-relevant control unit 40. In order to generate the second control signal dabl, the controllable switching unit 34 is connected at the fourth supply potential input terminal 36 to the battery voltage Vbatt. The battery voltage Vbatt can also be supplied internally to the monitoring module 33.

While the controllable switching unit 34 is only designed to generate the second control signal dabl, the initiation of the generation of the second control signal dabl is carried out by the monitoring module 33. The monitoring module 33 is designed to receive and to process data from the microcontroller 20 via the second data port 35 and, when a function of the microcontroller as intended is determined, to cause the controllable switching unit to generate the second control signal so that this corresponds to the first control signal.

In other words, the monitoring module 33 monitors the intended function of the microcontroller. If the intended function of the microcontroller 30 is given, then, for example, a second control signal dabl corresponding to the first control signal ctrl is generated by the monitoring unit 30. If a deviation from the intended function is determined, the content of the second control signal dabl deviates from the first control signal ctrl, causing the safety-relevant control unit 40 to deactivate the load 40L.

The data communication between the monitoring module 33 and the microcontroller 20 takes place via a communication link 20C. Depending on the selected communication protocol, the communication link 20C may comprise one or more data lines.

The monitoring unit is designed, for example, as an ASIC (application-specific integrated chip).

The safety-relevant control unit 40 receives the first control signal ctrl at a first input 41 and the second control signal dabl at a second input 42. The safety control unit 40 is designed to logically link the first and the second control signal 41, 42 with one another. To this end, an AND link can be used, for example. If, in this exemplary embodiment, the first and the second control signal ctrl, dabl do not match, a signal for switching off the safety-relevant load 40L is output at a control signal output 43.

For safety reasons, the safety-relevant load 40L is connected to the control signal output 43 via a protective circuit 40S. The protective circuit 40S is designed analogously to the protective circuits 10S, 30S. The safety-relevant load 40L may, for example, be a second control device which receives data via BUS interfaces (for example CAN, Ethernet, Flexray) via the safety control unit.

Various components of the device for controlling the safety-relevant electronic system are thus connected to the battery voltage. In the event of component faults, for example caused by aging effects, the battery voltage can propagate between the various components and possibly damage components there. Possible propagation paths of critical voltages, based on the battery voltages Vbatt fed in, are visualized by the arrows shown with broken lines or solid lines. A solid arrow line in this case indicates a fault that has a direct impact, while the arrows shown with a broken line represent fault propagation between the components.

The microcontroller 20 and the monitoring unit 30 are of decisive importance for the safety concept. Since these have a direct link to one another via the communication link 20C, which is connected to the input/output ports 23 and 35, an overvoltage can also propagate via this communication link 20C and damage components there.

Figure 2:
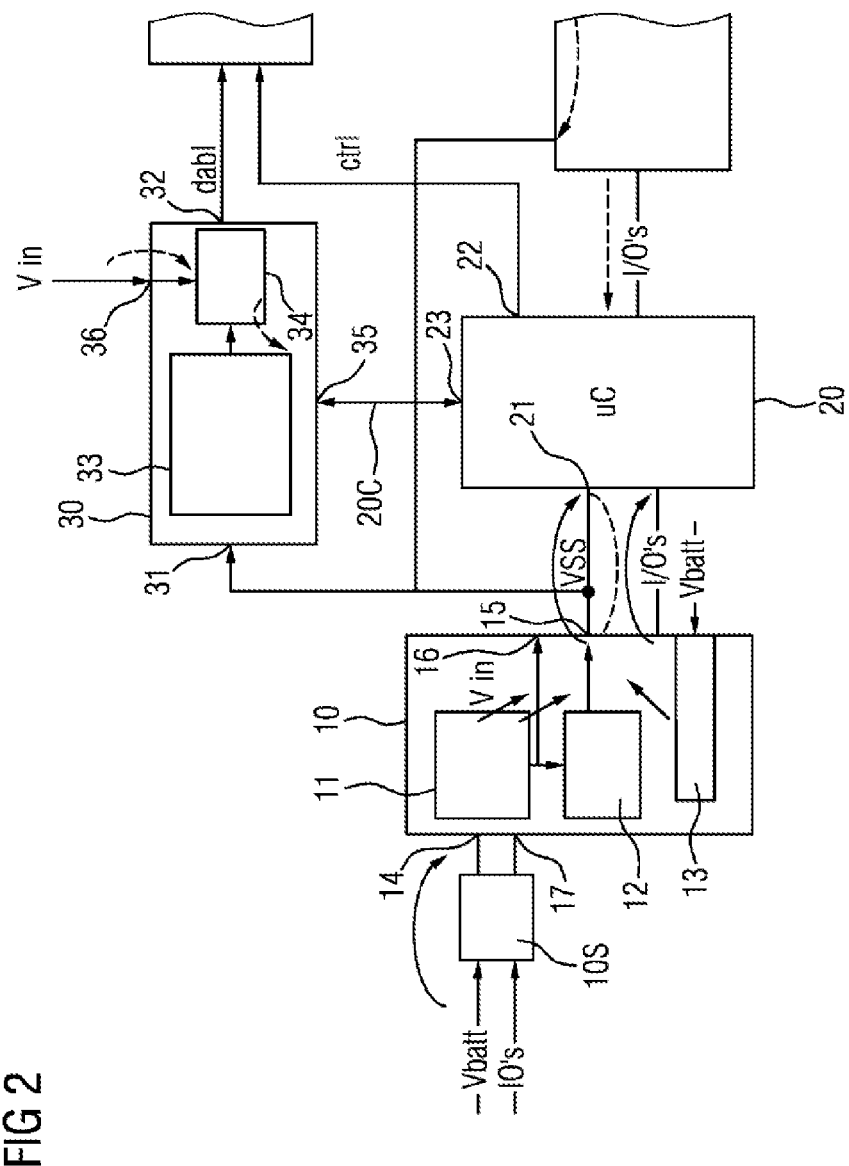
FIG. 2 shows a schematic illustration of the components according to the invention required for controlling a safety-relevant electronic system.

FIG. 2 shows a section of the device described in FIG. 1, in which a damaging propagation or fault propagation can be prevented. In FIG. 2, identical elements are provided with identical reference signs.

In contrast to the arrangement known from the prior art according to FIG. 1, the voltage supply of the monitoring unit 30 is not provided by the battery voltage Vbatt, but by the first supply voltage Vss, which is provided at the first supply potential output terminal 15 of the power supply unit 10 also to supply the microcontroller 20. The first supply voltage Vss is in this case a voltage that is downregulated by the first and the second voltage regulator 11, 12 compared to the battery voltage. If the battery voltage is, for example, 12V, the first supply voltage Vss may be, for example, 5V.

In order to prevent the propagation of faults from the power supply unit 10, the inputs and outputs of the monitoring unit 30 are designed to be voltage-proof as a first measure. Relevant inputs and outputs are the third supply potential input terminal 31 to which the first supply voltage Vss is applied, the second control output 32 via which the second control signal dabl is output for processing by the safety-relevant control unit 40, the second data port 35 via which communication with the microcontroller 20 takes place, as well as the fourth supply potential input terminal 36 via which the controllable switching unit 34 is supplied.

A voltage-proof design of the inputs and outputs is understood here to mean that these inputs and outputs, for example due to manufacturing measures, of the monitoring unit 30 are designed in such a way that they cannot be destroyed by a voltage that is in the range of the battery voltage. For example, at a battery voltage Vbatt of 12V, the aforementioned inputs and outputs are designed for a dielectric strength of 1.5 times, that is to say 18V. The factor f of the voltage increase may of course also be selected differently, where f>1, preferably f>1.2.

As a further measure, the controllable switching unit 34 is supplied neither via the battery voltage nor via the first supply voltage Vss, but via a second supply voltage Vin, which is provided at a second supply potential output terminal 16 of the power supply unit 10. The second supply voltage Vin (for example an existing pre-regulator voltage) is provided in this case at the output of the first voltage regulator 11 and then at the supply potential output terminal 16 of the power supply unit 10, this voltage also being fed to the second voltage regulator 12 as an input voltage. The second supply voltage Vin is selected such that it is lower than a first predetermined voltage value Vsw1, which corresponds to the maximum permissible voltage of the microcontroller 20 at which no damage occurs. If the supply voltage of the microcontroller is, for example, 5V, the second supply voltage Vin may be set to, for example, 5.8V or 6V. In any case, the second supply voltage is lower than the battery voltage, but is higher than the first supply voltage VSS.

As can be readily seen from the illustration in FIG. 2, the voltage regulator or the protective circuit for the monitoring unit 30 is saved. Redundant protective structures, for example duplication of diodes or capacitors, thus do not have to be provided. Furthermore, there is no direct dependence of the switch-off path on the battery voltage Vbatt.

As a result, the functional safety of the device for controlling the safety-relevant electronic system can be increased.

LIST OF REFERENCE SIGNS

10 Power supply unit
10S Protective circuit
11 First voltage regulator (pre-regulation system)
12 Second voltage regulator (linear or SMPS regulator)
13 Functional component
14 First supply potential input terminal
15 First supply potential output terminal
16 Second supply potential output terminal
17 Input/output port
18 Input/output port
20 Microcontroller
20C Communication link
21 Second supply potential input terminal of the microcontroller
22 First control output of the microcontroller
23 First data port
24 Input/output port
25 Input/output port
30 Monitoring unit
30S Protective circuit
31 Third supply potential input terminal of the monitoring unit
32 Second control output of the monitoring unit
33 Monitoring module
34 Controllable switching unit
35 Second data port
36 Fourth supply potential input terminal of the monitoring unit
40 Safety control unit
40S Protective circuit
40L Load (safety-relevant)
41 First input for first control signal ctrl
42 Second input for second control signal dabl
43 Control signal output
44 Fifth supply potential input terminal of the safety control unit
50 Logic control unit
50S1 Protective circuit
50S2 Protective circuit
50L Load (not safety-relevant)
51 Input/output port
52 Control signal output
53 Control signal output or input/output port
Vbatt Battery voltage
Vss First supply voltage
Vin Second supply voltage
ctrl First control signal
dabl Second control signal
Vsw1 First predetermined voltage value

The invention claimed is:

1. A device for controlling a safety-relevant electronic system, comprising:
a power supply having at least one voltage regulator, wherein said power supply being supplied with a battery voltage during operation at a first supply potential input terminal and supplying a first supply voltage at a first supply potential output terminal being lower than the battery voltage;
a safety-relevant control unit;
a microcontroller for generating a first control signal, being provided at a first control output of said microcontroller for processing by way of said safety-relevant control unit, wherein said microcontroller being supplied with the first supply voltage at a second supply potential input terminal of said microcontroller, said microcontroller further having a first data port;
a monitoring unit for generating a second control signal, being provided at a second control output of said monitoring unit for processing by way of said safety-relevant control unit, said monitoring unit being supplied with the first supply voltage at a third supply potential input terminal of said monitoring unit, said monitoring unit further containing a second data port, wherein said third supply potential input terminal, said second control output and said second data port of said monitoring unit being configured to be voltage-proof with respect to the battery voltage; and
a communication link disposed between said first data port of said microcontroller and said second data port of said monitoring unit.

2. The device according to claim 1, wherein said monitoring unit contains a controllable switch for generating the second control signal, wherein said controllable switch is supplied with a second supply voltage at a fourth supply potential input terminal of said monitoring unit which is lower than a first predetermined voltage value which corresponds to a maximum permissible voltage of said microcontroller at which no damage occurs.

3. The device according to claim 2, wherein the second supply voltage is greater than a second predetermined voltage value which is greater than the first supply voltage.

4. The device according to claim 2, wherein said at least one voltage regulator of said power supply includes a first voltage regulator for generating the second supply voltage and a second voltage regulator for generating the first supply voltage.

5. The device according to claim 4, wherein said second voltage regulator is supplied with the second supply voltage generated by said first voltage regulator as an input voltage.

6. The device according to claim 1, wherein all inputs and outputs of said monitoring unit are configured to be voltage-proof with regard to the battery voltage.

7. The device according to claim 2, wherein said monitoring unit contains a monitoring module which is configured to receive and to process data from said microcontroller via said second data port and, when a function of said microcontroller as intended is determined, to cause said controllable switch to generate the second control signal.

8. The device according to claim 1, wherein the safety-relevant electronic system is a part of a vehicle.

9. A device for controlling a safety-relevant electronic system, comprising:
- a power supply having at least one voltage regulator, wherein said power supply being supplied with a battery voltage during operation at a first supply potential input terminal and supplying a first supply voltage at a first supply potential output terminal being lower than the battery voltage;
- a safety-relevant control unit;
- a microcontroller for generating a first control signal, being provided at a first control output of said microcontroller for processing by way of said safety-relevant control unit, wherein said microcontroller being supplied with the first supply voltage at a second supply potential input terminal of said microcontroller, said microcontroller further having a first data port;
- a monitoring unit for generating a second control signal, being provided at a second control output of said monitoring unit for processing by way of said safety-relevant control unit, said monitoring unit being supplied with the first supply voltage at a third supply potential input terminal of said monitoring unit, said monitoring unit further containing a second data port, wherein said third supply potential input terminal, said second control output and said second data port of said monitoring unit being configured to be voltage-proof with respect to the battery voltage;
- a communication link disposed between said first data port of said microcontroller and said second data port of said monitoring unit; and
- all said inputs and said outputs of said monitoring unit configured to be voltage-proof with regard to the battery voltage.

10. The device according to claim 9, wherein said monitoring unit contains a controllable switch for generating the second control signal, wherein said controllable switch is supplied with a second supply voltage at a fourth supply potential input terminal of said monitoring unit which is lower than a first predetermined voltage value which corresponds to a maximum permissible voltage of said microcontroller at which no damage occurs.

11. The device according to claim 10, wherein the second supply voltage is greater than a second predetermined voltage value which is greater than the first supply voltage.

12. The device according to claim 10, wherein said at least one voltage regulator of said power supply includes a first voltage regulator for generating the second supply voltage and a second voltage regulator for generating the first supply voltage.

13. The device according to claim 12, wherein said second voltage regulator is supplied with the second supply voltage generated by said first voltage regulator as an input voltage.

14. The device according to claim 10, wherein said monitoring unit contains a monitoring module which is configured to receive and to process data from said microcontroller via said second data port and, when a function of said microcontroller as intended is determined, to cause said controllable switch to generate the second control signal.

15. The device according to claim 9, wherein the safety-relevant electronic system is a part of a vehicle.

* * * * *